United States Patent [19]
Nakamura et al.

[11] Patent Number: 4,578,017
[45] Date of Patent: Mar. 25, 1986

[54] METHOD FOR STOPPING A MULTI-STAGE HYDRAULIC MACHINE

[75] Inventors: Taizo Nakamura; Katsuyuki Kawahara, both of Hachioji, Japan

[73] Assignee: Kabushiki Kaisha Toshiba, Kawasaki, Japan

[21] Appl. No.: 599,773

[22] Filed: Apr. 13, 1984

[30] Foreign Application Priority Data

Apr. 14, 1983 [JP] Japan ................... 58-66020

[51] Int. Cl.$^4$ .................. F01D 21/14; F03B 13/10
[52] U.S. Cl. .......................... 415/1; 415/29; 415/500
[58] Field of Search ............ 415/1, 14, 15, 17, 18, 415/20, 24, 26, 29, 48, 500, 153 R

[56] References Cited

U.S. PATENT DOCUMENTS

| | | | |
|---|---|---|---|
| 3,275,293 | 9/1966 | Hosogai et al. | 415/500 X |
| 4,073,594 | 2/1978 | Takagi et al. | 415/1 |
| 4,346,304 | 8/1982 | Tsunoda et al. | 415/500 X |
| 4,472,104 | 9/1984 | Kuwabara | 415/1 |
| 4,474,528 | 10/1984 | Yokoyama et al. | 415/500 X |
| 4,475,865 | 10/1984 | Sugishita et al. | 415/500 X |

FOREIGN PATENT DOCUMENTS

| | | | |
|---|---|---|---|
| 50435 | 4/1977 | Japan | 415/1 |
| 122036 | 10/1978 | Japan | 415/1 |

*Primary Examiner*—Robert E. Garrett
*Assistant Examiner*—Joseph M. Pitko
*Attorney, Agent, or Firm*—Oblon, Fisher, Spivak, McClelland & Maier

[57] ABSTRACT

A method for stopping a multi-stage hydraulic machine with an inlet valve, guide vanes including highest and lowest stage guide vanes, and a return passage connected between flow passages of respective stages, wherein the machine is in turbine operation, including the steps of initiating the closing of the highest stage movable guide vanes firstly and the lowest stage movable guide vanes secondly and judging whether a closing relation between the highest and lowest stage vanes is normal or not in accordance with predetermined criteria after initiation of closing the lowest stage movable guide vanes. The method includes the steps of controlling the closing of the lowest stage movable guide vanes based on the judgement result, and the step of closing the inlet valve.

6 Claims, 5 Drawing Figures

METHOD FOR STOPPING A MULTI-STAGE HYDRAULIC MACHINE

BACKGROUND OF THE INVENTION

1. Field of the Invention

This invention relates to a method for operating a multi-stage hydraulic machine, and more particularly to a method for stopping a multi-stage hydraulic machine having an inlet valve, plural guide vanes including highest and lowest stage guide vanes, and a return passage connected between flow passages of respective stages.

The term "multi-stage hydraulic machine" as used in this specification and in the appended claims includes a multi-stage water-turbine and a multi-stage pump-turbine which can be operated as a turbine.

2. Description of the Prior Art

In general, the operation of a multi-stage water-turbine or a multi-stage pump-turbine is performed by controlling openings of guide vanes arranged circumferentially around the runners so as to adjust the flow rate of water that passes through the runners.

Figure 1:
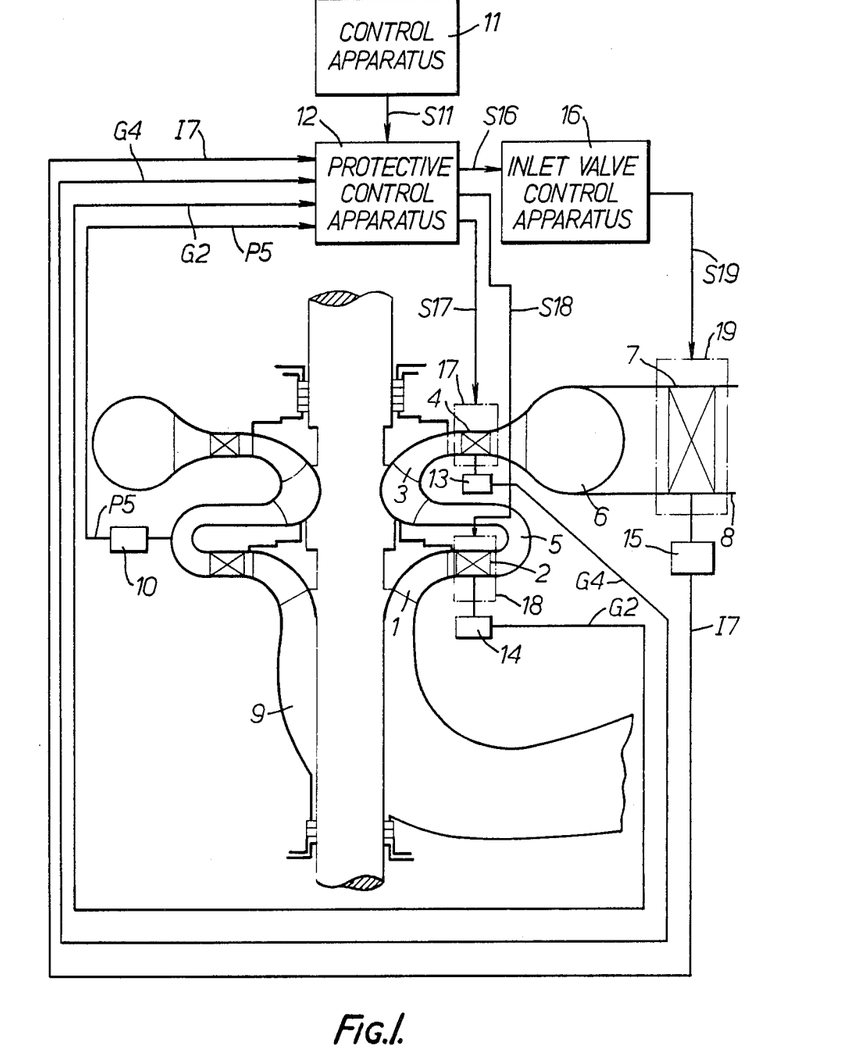
FIG. 1 is a schematic diagram illustrating a two-stage pump-turbine to which methods according to embodiments of this invention are applied.

Hereinafter, description will be made with respect to a Francis type two-stage pump-turbine as an example of a multi-stage hydraulic machine. FIG. 1 is schematic diagram showing a Francis type two-stage pump-turbine, wherein reference numeral 1 designates a runner of a low stage, reference numeral 2 designates movable guide vanes of the low stage, reference numeral 3 designates a runner of a high stage, and reference numeral 4 designates movable guide vanes of the high stage, respectively. The high stage portion communicates with the low stage portion through a return passage 5. Reference numeral 6 designates a casing, reference numeral 7 designates an inlet valve, reference numeral 8 designates a penstock and reference numeral 9 designates a draft tube.

When the two-stage pump-turbine with such a configuration operates as a turbine, water that flows from the penstock 8 through the inlet valve 7 into the casing 6 is drained to a trailrace (not shown) through a route of the movable guide vanes 4, the runner 3, the return passage 5, the movable guide vanes 2, the runner 1 and the draft tube 9. On the other hand, when the two-stage pump-turbine operates as a pump, the runner 1 pumps water up to an upper dam (not shown) through a route opposite to that in case of the turbine operation.

When the two-stage pump-turbine is operating as a turbine, it is necessary to control the movable guide vanes to close rapidly in case of stoppage from normal turbine operation or from turbine load interruption upon occurrence of failure. Closure of the movable guide vanes causes the water flow rate to be varied, so that water pressure fluctuation will be induced due to a water hammering phenomenon resulting from the variation in the water flow rate in the movable vanes. This produces water pressure waves which are propagated into the respective flow passages. The water pressure waves are reflected mainly at the narrowest portion of the flow passages and then propagated to the flow passages outside the narrowest portion. Thus, when the water pressure fluctuation is abnormally large, the flow passages are in danger of partial damage or even a severe breakdown. In the two-stage pump-turbine, the return passage 5 is shaped of such a complicated flow passage configuration that the structural strength of the return passage is liable to be weakened, which causes a serious problem. Therefore, a safe and assured control method for the two-stage pump-turbine is needed such that the water pressure waves are not directly applied to the return passage 5.

Hereinafter a conventional method for stopping the two-stage pump-turbine operating as a turbine will be described. In case of stopping the two-stage pump-turbine, firstly the movable guide vanes 4 and 2 are controlled to be closed in concert, or they are controlled to be closed in order with a predetermined time period between first closing of the movable guide vanes 4 and subsequent closing of the movable guide vanes 2. Next, the inlet valve 7 is controlled to be closed after the movable guide vanes 4 are completely closed. Water pressure fluctation in this case is applied to the outer portions of the movable guide vanes 4 and 2, in which the flow passages thereof are narrowed, namely to the flow passage of the casing 6 and the return passage 5, respectively. The water pressure within the flow passage of the casing 6 varies in accordance with the opening of the movable guide vanes 4, while the water pressure within the return passage 5 varies in accordance with the opening of the movable guide vanes 2. Accordingly, the water pressure waves due to the water pressure fluctation in the penstock 8 derived from the water hammering phenomenon are mainly applied to the flow passage of the casing 6, and not directly to the return passage 5. Under normal operation, the return passage 5 only receives a water pressure component which is assigned to the runner 1.

Next, description will be made as to the case when a failure occurs during control of closing of the movable guide vanes 4 and 2. After commencement of the stopping control of the movable guide vanes 4 and 2, wherein vanes 4 and 2 are controlled to be closed in concert or in order, if a failure occurs during closing such that the closing speed of the movable guide vanes 4 becomes slower than a predetermined speed, or the closing speed of the movable guide vanes 2 becomes faster than another predetermined speed, the opening of the movable guide vanes 2 may become equal to or smaller than that of the movable guide vanes 4. Under such a condition, the water pressure wave from the penstock 8 will be applied to the flow passage outside the movable guide vanes 2, i.e., the return passage 5, instead of the flow passage of the casing 6 to which the water pressure wav is to be applied during normal closing control operation. The resultant water pressure fluctuation in the return passage 5 continues to be abnormally large until the movable guide vanes 2 are completely closed, and this may cause either partial damage or a severe breakdown in the return passage 5, which is a serious problem.

As described above, there is a need for a method for stopping a multi-stage hydraulic machine operating as a turbine, which method can stop the multi-stage hydraulic machine without applying water pressure waves arising due to the water pressure fluctuation to the return passage even when a failure occurs in the closing control of the movable guide vanes.

SUMMARY OF THE INVENTION

Accordingly, the objects of this invention are to provide a method for stopping a multi-stage hydraulic machine having an inlet valve, plural guide vanes including highest and lowest stage movable guide vanes, and a return passage connected between flow passages of respective stages, wherein the multi-stage hydraulic machine operating as a turbine can be stopped safely and accurately without applying water pressure waves arising due to the water pressure fluctuation to the return passage even when a failure occurs in the highest and lowest stage movable guide vanes or the operating mechanisms thereof.

These and other objects of this invention are achieved by providing a novel method for stopping a multi-stage hydraulic machine having an inlet valve, plural guide vanes including highest and lowest stage guide vanes, and a return passage connected between flow passages of respective stages, the multi-stage hydraulic machine being in turbine operation, including the steps of firstly initiating the closing of the highest stage movable guide vanes, secondly initiating the closing of the lowest stage movable guide vanes, and judging whether a closing relation between the highest and lowest stage guide vanes is normal or not in accordance with predetermined criteria after initiation of closing the lowest stage movable guide vanes. The judging step includes the steps of continuing to close the lowest stage movable guide vanes when the closing relation is judged to be normal and the lowest stage movable guide vanes are in closing operation, stopping the closing of the lowest stage movable guide vanes when the closing relation is judged to be abnormal and the lowest stage movable guide vanes are in closing operation, continuing to stop closing of the lowest stage movable guide vanes when the closing relation is judged to be abnormal and the lowest stage movable guide vanes are stopped, and resuming closing of the lowest stage movable guide vanes when the closing relation is judged to be normal and the lowest stage movable guide vanes are stopped. The method further includes the steps of repeating the judging step if the lowest stage movable guide vanes are not completely closed, and closing the inlet valve after the highest stage movable guide vanes are completely closed.

In an alternative embodiment, the objects of this invention are achieved by providing a novel method for stopping a multi-stage hydraulic machine as described above, which is in turbine operation, including the steps of firstly initiating the closing of the highest stage movable guide vanes, secondly initiating the closing of the lowest stage movable guide vanes, and judging whether a closing relation between the highest and lowest stage guide vanes is normal or not in accordance with predetermined criteria after initiation of closing the lowest stage movable guide vanes, continuing to close the highest and lowest stage guide vanes when the closing relation is judged to be normal, returining to the judging step after the continuing step if the lowest stage movable guide vanes are not completely closed, and stopping the closing of the highest and lowest stage movable guide vanes when the closing relation is judged to be abnormal. The method further includes the steps of closing the inlet valve at the same time or after the stopping step, and resuming the closing of the highest and lowest stage movable guide vanes after the inlet valve is completely closed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to the drawings wherein like reference numerals designate identical or corresponding parts throughout the several views, and more particularly to FIG. 1 thereof which shows the Francis type two-stage pump-turbine, there is provided a water pressure detector 10 at the return passage 5 which detects the water pressure P5 in the return passage 5. Reference numeral 11 designates a control apparatus for producing a stop command S11 to stop the operation of the two-stage pump-turbine. Reference numeral 12 designates a protective control apparatus which initiates its operation on receipt of the stop command S11 from the control apparatus 11. There are also provided detectors 13, 14 and 15 for detecting openings G4, G2 and I7 of the movable guide vanes 4 of the high stage, the movable guide vanes 2 of the low stage and the inlet valve 7, respectively. The protective control apparatus 12 further receives the water pressure P5 in the return passage 5, the openings G4, G2 and I7 of the movable guide vanes 4 and 2 and of the inlet valve 7 from the detectors 10, 13, 14 and 15, respectively, and produces a closing control signal S17, a closing control signal S18 and a control signal S16 to operating mechanism units 17 and 18 and to an inlet valve control apparatus 16, respectively, in order to control the closing of the movable guide vanes 4 and 2 and the inlet valve 7, respectively. The construction and function of the protective control apparatus 12 will be described later. The inlet valve control apparatus 16 generates and applies a closing control signal S19 to an operating mechanism unit 19 for the inlet valve 7 on receipt of the control signal S16. To simplify the drawing, the connections between the operating mechanism units 17, 18 and 19 and the movable guide vanes 4 and 2 and the inlet valve 7, respectively, are omitted, and the operating control units 17, 18 and 19 are drawn only schematically.

Figure 2:
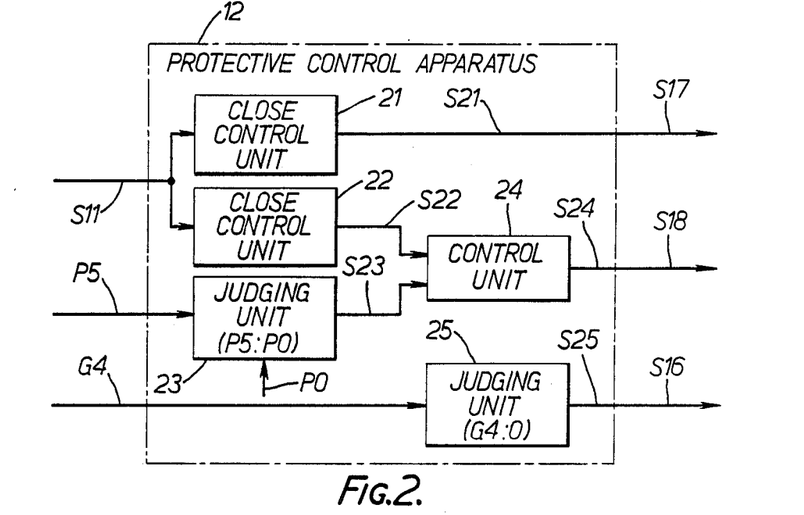
FIG. 2 is a block diagram of a protective control apparatus by which a method according to an embodiment of this invention can be practiced.

FIG. 2 is a block diagram of the protective control apparatus 12 by which a method according to an embodiment of this invention can be practiced. In FIG. 2, close control units 21 and 22 for the movable guide vanes 4 and 2 receive the stop command S11 from the control apparatus 11 and produce control signals S21 and S22 to close the movable guide vanes 4 and 2, respectively, following the predetermined time sequences, wherein vanes 2 and 4 are controlled to be closed either in concert or in order. The close control units 21 and 22 are conventional and the construction thereof is well known to those skilled in the art. Accordingly the detailed description thereof is omitted.

A judging unit 23 receives the water pressure P5 from the water pressure detector 10 and judges whether or not the value of the detected water pressure P5 is smaller than a predetermined pressure value P0 to produce a decision signal S23 based on the judgement result. A control unit 24 receives the control signal S22 and the decision signal S23 and produces a control signal S24 as described below. When the control signal S23 indicates that the pressure value P5 is equal to or larger than the predetermined pressure value P0, the control signal S22 is blocked in the control unit 24 and when the decision signal S23 indicates the pressure value P5 is smaller than the predetermined pressure value P0, the control signal S22 is outputted from the control unit 24 as the control signal S24. The control signals S21 and S24 are supplied to the operating mechanism units 17 and 18 for the movable guide vanes 4 and 2 as the closing control signals S17 and S18, respectively.

A judging unit 25 receives the opening signal G4 from the detector 13 and produce a decision signal S25 when the opening signal G4 indicates that the movable guide vanes 4 are completely closed. The decision signal S25 is applied as the control signal S16 to the inlet valve control apparatus 16, which generates and applies the closing control signal S19 to the operating mechanism unit 19 on receipt of the control signal S16.

Figure 3:
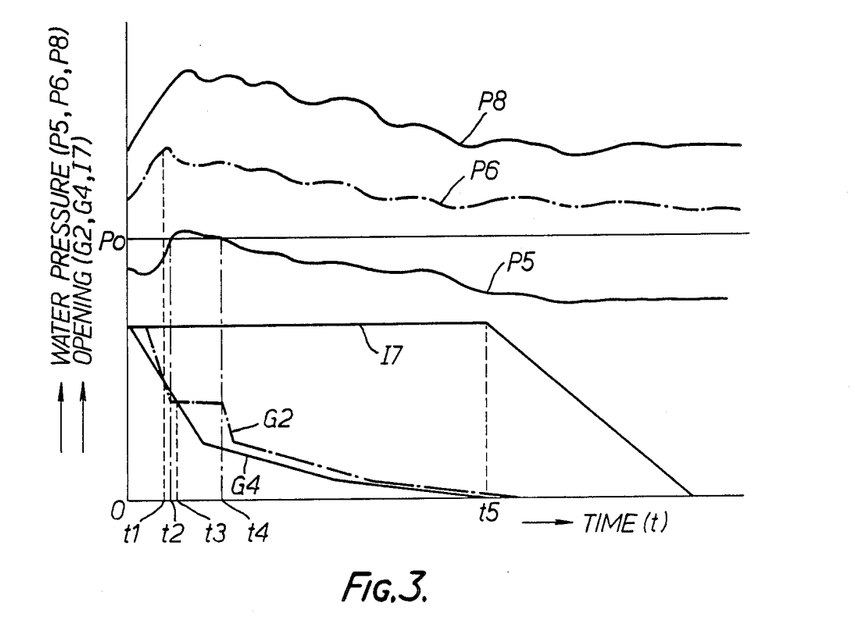
FIG. 3 is a graph illustrated the characteristics of the two-stage pump-turbine during stopping operation thereof according to an embodiment of this invention.

Hereinafter a method according to an embodiment of this invention will be described in detail with reference to FIGS. 1, 2 and 3. FIG. 3 is a graph illustrating the characteristics of the two-stage pump-turbine during stopping operation thereof according to an embodiment of this invention, wherein P6 and P8 designate water pressure values in the casing 6 and the penstock 8, respectively. When the protective control apparatus 12 receives the stop command S11 from the control apparatus 11, the control units 21 and 22 output control signals S21 an S22. The protective control apparatus 12 also receives the water pressure value P5 in the return passage 5 from the water pressure detector 10. When the guide vanes 4 and 2 and the control mechanism units 17 and 18 thereof are all in order, the water pressure value P5 is smaller than the predetermined pressure value P0 during stopping operation, and the control signal S22 is outputted from the control unit 24 as the control signals S24. Accordingly, the control signals S21 and S24 are supplied to the operating mechanism units 17·and 18 for the movable guide vanes 4 and 2 as closing control signals S17 and S18 to close the guide vanes 4 and 2, respectively, in concert or in order. When the protective control apparatus 12 judges that the movable guide vanes 4 are completely closed based on the opening signal G4 detected by the detector 13, it outputs the control signal S16 to the inlet valve control apparatus 16. Then the inlet valve control apparatus 16 generates the closing control signal S19 to the operating mechanism unit 19 thereby to close the inlet valve 7. Thus the stopping operation of the two-stage pump-turbine is finished.

Next, description will be made as to the case when a failure occurs in the close control of the movable guide vanes 2. Here, FIG. 3 shows the case where the movable guide vanes 4 and 2 are controlled to be closed in order. If a failure occurs such that the closing speed of the guide vanes 2 becomes faster than the predetermined speed, the opening G2 of the movable guide vanes 2 becomes smaller than the opening G4 of the movable guide vanes 4 after a time t1 as shown in FIG. 3. This causes water pressure fluctuation to be shifted from the casing 6 to the return passage 5, as shown in the characteristics curve of the water pressure P5.

The water pressure fluctuation within the return passage 5 is detected by the water pressure detector 10, and when the judging unit 23 judges that the water pressure P5 of the return passage 5 becomes equal to the predetermined pressure P0, the control signal S22 is blocked in the control unit 24 at a time t2. As a result, the close control of the movable guide vanes 2 is stopped to cause the opening G2 of the movable guide vanes 2 to be fixed. On the outer hand, the close control of the guide vanes 4 still continues, so that at a time t3 the opening G4 of the movable guide vanes 4 becomes equal to the opening G2 of the movable guide vanes 2 which has been fixed. As a result, the water pressure fluctuation shifts from the return passage 5 to the casing 6, after the time t3, which causes the water pressure P5 of the return passage to be lowered. The thus lowered pressure P5 of the return passage 5 is detected by the water pressure detector 10 and when the judging unit 23 judges that the water pressure P5 becomes smaller than the predetermined pressure value P0 at a time t4, the control signal S22 is unblocked by the decision signal S23 in the control unit 24 to again generate the closing control signal S18 thereby to resume the close control of the movable guide vanes 2. When it is detected that the movable guide vanes 4 are completely closed at a time t5, the inlet valve 7 is initiated to be closed. Thus the stopping operation of the two-stage pump-turbine is finished.

As described above, the water pressure P5 applied to the return passage 5 during stopping operation as produced by the water pressure fluctuation due to the water hammering phenomenon, can be kept within an allowable pressure value by selecting the predetermined pressure value P0 to a proper value.

Although an example was described such that the closing speed of the movable guide vane 2 became faster than the predetermined value, even in the case where the closing speed of the movable guide vanes 4 becomes slower than the predetermined value due to occurrence of a failure therein, a control similar to the above-described method may also be achieved.

As can be seen from the above description, this embodiment can achieve a stopping control such as to protect against damage or breakdown of the return passage 5, which has complicated flow passage configurations, by only providing the water pressure detector 10 on the return passage 5 and by controlling the two-stage pump-turbine based on the water pressure value P5 detected by the water pressure detector 10. This is because even when a failure occurs in the close control of the movable guide vanes 4 and 2, the two-stage pump-turbine may be controlled to be stopped without giving excessive water pressure fluctuation to the return passage 5 by temporarily causing the opening G2 of the movable guide vanes 2 to be fixed.

In the aforementioned embodiment, the stopping control for a two-stage pump-turbine is performed such that a failure in close control of both the higher- and lower-stage movable guide vanes is detected by the water pressure of the return passage. However, stopping control can also be achieved by monitoring the openings of the respective stage movable guide vanes instead of the water pressure of the return passage. In this case, the step of judging whether the water pressure value of the return passage is larger than the predetermined pressure value is replaced by the step of judging whether the opening of the higher stage movable guide vanes is smaller than that of the lower stage movable guide vanes.

Figure 4:
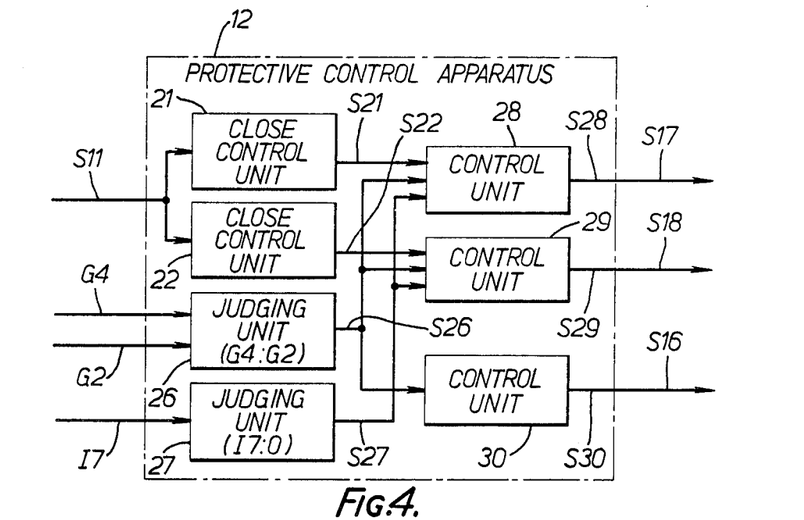
FIG. 4 is a block diagram of the protective control apparatus by which a method according to another embodiment of this invention can be practiced and FIG. 5 is a graph illustrating characteristics of the two-stage pump turbine during stopping operation thereof according to the FIG. 4 embodiment of this invention.

Next, another embodiment according to this invention will be described with reference to FIGS. 1, 4 and 5. FIG. 4 is a block diagram of the protective control apparatus 12 by which a method according to another embodiment of this invention can be practised. In FIG. 4, the close control units 21 and 22 receive the stop command S11 and produce the control signal 21 and S22, respectively, as in FIG. 2. A judging unit 26 receives signals indicative of the openings G4 and G2 of the movable guide vanes 4 and 2 from the detectors 13 and 14, respectively, and judges whether or not the opening G4 is smaller than the opening G2 to produce a decision signal S26 based on the judgement result. A judging unit 27 receives the opening 17 of the inlet valve 7 from the detector 15 and produces a decision signal S27 when the opening signal 17 indicates that the inlet valve 7 is completely closed. A control unit 28 receives the control signal S21 from the close control unit 21, the decision signal S26 from the judging unit 26 and the decision signal S27 from the judging unit 27, and produces a control signal 28. A control unit 29 receives the control signal S22, the decision signals S26 and S27, and produces a control signal S29. The construction of the control unit 29 is the same as that of the control unit 28. While the decision signal S26 indicates that the opening G4 is smaller than the opening G2, the control signals S21 and S22 are outputted as control signals S28 and S29 of the control units 28 and 29 to close the movable guide vanes 4 and 2, respectively. When the decision signal S26 indicates that the opening G4 is equal to or larger than the opening G2, the control signals S21 and S22 are blocked and the control signals S28 and S29 are outputted to fix the openings G4 and G2 of the movable guide vanes 4 and 2, respectively. Then, when the decision signal S27 indicates that the inlet valve 7 is completely closed, the control signals S21 and S22 are unblocked and outputted as the control signals S28 and S29 to resume closing of the movable guide vanes 4 and 2, respectively. A control unit 30 receives the decision signal S26 from the judging unit 26 and produces a control signal S30 when the decision signal S26 indicates tht the opening G4 is equal to or larger than the opening G2. The control signal S30 is applied as the control signal S16 to the inlet valve control apparatus 16.

Figure 5:
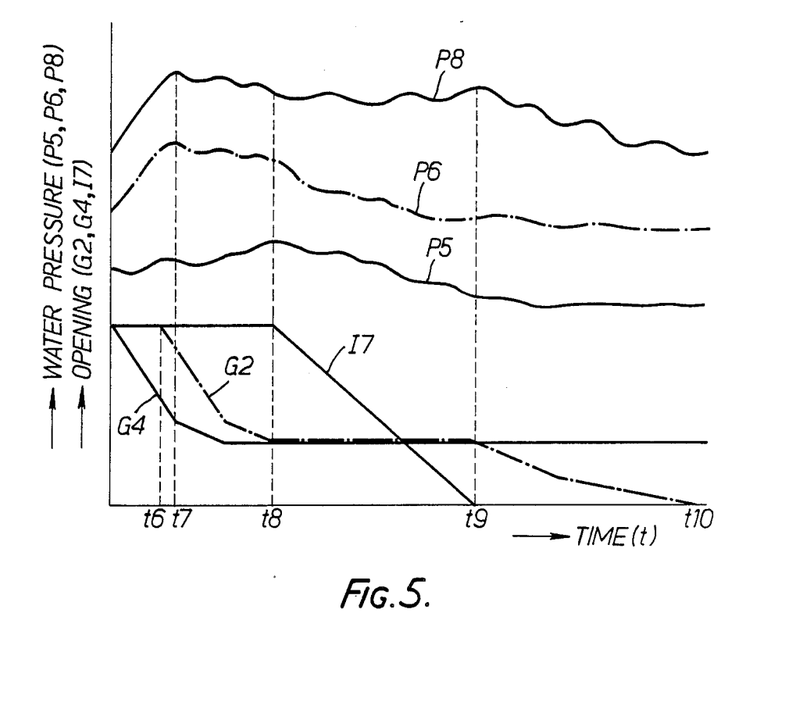

FIG. 5 is a graph illustrating the characteristics diagram of the two-stage pump-turbine during stopping operation thereof according to the embodiment of this invention above described by reference to FIGS. 1 and 4. When the protective control apparatus 12 receives the stop command S11 from the control apparatus 11, the control units 21 and 22 output control signals S21 and S22. The protective control apparatus 12 also receives the openings G4 and G2 of the movable guide vanes 4 and 2 from the detectors 13 and 14, respectively. When the movable guide vanes 4 and 2 and the control mechanism units 17 and 18 thereof are all in order, the opening G4 is smaller than the opening G2 during the closing operation of the movable guide vanes 4 and 2, and the control signals S21 and S22 are outputted from the control units 28 and 29 as the control signals S28 and S29, respectively. Accordingly, the control signals S28 and S29 are supplied to the operating mechanism units 17 and 18 of the movable guide vanes 4 and 2 as closing control signals S17 and S18 to close the movable guide vanes 4 and 2 in concert or in order, respectively. When the protective control apparatus 12 judges that both the movable guide vanes 4 and 2 are completely closed, it outputs the control signal S16 to the inlet valve control apparatus 16. Then the inlet valve control apparatus 16 generates the closing control signal S19 to the operating mechanism unit 19 thereby to close the inlet valve 7. Thus the stopping operation of the two-stage pump-turbine is finished.

Next, description will be made as to the case when a failure occurs in the close control of the movable guide vanes 4. FIG. 5 shows the case where the movable guide vanes 4 and 2 are controlled to be closed in order. When the stop command S11 is produced in the control apparatus 11 and supplied to the protective control apparatus 12, the movable guide vanes 4 are controlled to be closed based on the control signal S21 from the close control unit 21 in accordance with the characteristics curve of the opening G4 as shown in FIG. 5. At a time t6, the movable guide vanes 2 are initiated to be closed based on the control signal S22 from the close control unit 22. The movable guide vanes 2 are controlled to be closed such that the opening G2 of the movable guide vanes is maintained greater than the opening G4 of the movable guide vanes 4 in accordance with the characteristics curve of the opening G2 as shown in FIG. 5. In this case water pressure fluctuation is applied to the casing 6 in accordance with the curve of the water pressure P6 in the casing 6. Next, after the movable guide vanes 4 fall in a retardation state at a time t7, the opening G2 of the movable guide vanes 2 becomes closer to the opening G4 of the movable guide vanes 4 after the elapse of time. At a time t8, when the judging unit 26 judges that the opening G2 becomes equal to the opening G4, the close control of both the movable guide vanes 4 and 2 are interrupted by the control units 28 and 29 which block the control signals S21 and S22 based on the decision signal S26, respectively. At the same time, the control unit 30 produces the control signal S30 based on the decision signal S26 thereby to control the inlet valve 7 to be closed. Therefore, the water pressure fluctuation shifts from the casing 6 to the penstock 8 as shown in the curve of the water pressure P8 in the penstock 8. Subsequently, provided that the inlet valve 7 is completely closed at a time t9, the close control of the movable guide vanes 4 and 2 is resumed by the control circuits 28 and 29 based on the decision signal S27, thereby causing the movable guide vanes 2 to be completely closed at a time t10. The movable guide vanes 4 are also caused to be closed, but the opening G4 of the movable guide vanes 4 remains in the fixed state due to the retardation failure as shown in FIG. 5. As described above, according to this other embodiment of this invention, the water pressure fluctuation is not applied directly to the return passage 5.

In FIG. 5, the case is shown when the movable guide vanes 4 falls into a retardation state in the process of close control. However, even in a case where the movable guide vanes 2 falls in failure and consequently the opening G2 of the movable guide vanes 2 approach the opening G4 of the movable guide vanes 4, and equivalent control may also be achieved. In this case, the movable guide vanes 4 are ultimately rendered to be completely closed by the control signal S28 from the control unit 28 after the judging unit 27 judges that the inlet valve 7 is completely closed.

As can be seen from the aforementioned, according to the above described embodiment, even when the close control of the movable guide vanes 4 and/or the movable guide vanes 2 fails, the openings of both the movable guide vanes 4 and 2 are fixed, and the inlet valve 7 is controlled to be closed when the opening G2 of the movable guide vanes 2 becomes equal to the opening G4 of the movable guide vanes 4. Thus the water pressure fluctuation is not directly applied to the return passage 5. Therefore, a stoppage control method can be achieved which is capable of protecting the return passage 5, which may have a complicated flow passage structure, against damage or breakdown.

In the aforementioned embodiment, the stoppage control for a two-stage pump-turbine is performed such that a failure in close control of both the higher- and lower-stage movable guide vanes is detected by the openings of both the movable guide vanes. However a stoppage control can also be achieved as above described by monitoring the water pressure in the return passage instead of the openings of both the movable guide vanes. In this case the step of judging whether or not the opening of the higher stage movable guide vanes is smaller than that of the lower stage guide vanes is replaced by the step of judging whether or not the water pressure of the return passage is larger than the predetermined pressure value.

Moreover, in the aforementioned respective embodiments, description has been made as to a two-stage pump-turbine, however, this invention is also applicable to a multi-stage pump-turbine and a multi-stage water-turbine in the same manner as described above. When the aforementioned embodiments are adapted for a multi-stage water-turbine or a multi-stage pump-turbine, mechanical stress applied to such portions as the return passage, the lower stage guide vanes and the lower stage runner may be made sufficiently smaller compared with mechanical stress applied to such portions as the casing, the higher stage guide vanes and the higher stage runner, so that this invention contributes significant economical advantages to the design of a multi-stage water-turbine or a multi-stage pump-turbine.

As described above, according to the present invention, there can be provided a safe and accurate method for stopping a multi-stage hydraulic machine operating as a turbine having an inlet valve, guide vanes including highest and lowest stage movable guide vanes, and a return passage connected between flow passages of respective stages, wherein even when a failure occurs in the movable guide vanes of the respective stages or in the closing control mechanism thereof, the stress of water pressure waves due to water pressure fluctuation is not directly applied to the return passage.

Obviously numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A method for stopping a multi-stage hydraulic machine having an inlet valve, guide vanes including highest stage movable guide vanes and lowest stage movable guide vanes, and a return passage connected between flow passages of respective stages, said multi-stage hydraulic machine being in turbine operation, said method comprising the steps of:
   initiating the closing of said highest stage movable guide vanes;
   initiating the closing of said lowest stage movable guide vanes after initiation of closing said highest stage movable guide vanes;
   judging whether a closing relation between said highest stage movable guide vanes and said lowest stage movable guide vanes is normal or not in accordance with predetermined criteria after initiation of closing said lowest stage movable guide vanes, said judging step including the steps of,
   continuing to close said lowest stage movable guide vanes when said closing relation is judged to be normal and said lowest stage movable guide vanes are in closing operation,
   stopping the closing of said lowest stage movable guide vanes when said closing relation is judged to be abnormal and said lowest stage movable guide vanes are in closing operation, and
   continuing to stop the closing of said lowest stage movable guide vanes when said closing relation is judged to be abnormal and closing of said lowest stage movable guide vanes is stopped;
   resuming closing of said lowest stage movable guide vanes when said closing relation is judged to be normal and closing of said lowest stage movable guide vanes is stopped;
   repeating said judging step if said lowest stage movable guide vanes are not completely closed; and
   closing said inlet valve after said highest stage movable guide vanes are completely closed.

2. The method according to claim 1, wherein said judging step comprises:
   deciding whether or not said closing relation is normal in accordance with whether or not an opening of said highest stage movable guide vanes is smaller than an opening of said lowest stage movable guide vane.

3. The method according to claim 1, wherein said judging step comprises:
   deciding whether or not said closing relation is normal in accordance with whether or not a water pressure value in said return passage is smaller than a predetermined water pressure value.

4. A method for stopping a multi-stage hydraulic machine having an inlet valve, guide vanes including highest stage movable guide vanes and lowest stage movable guide vanes, and a return passage connected between flow passage of respective stages, said multi-stage hydraulic machine being in turbine operation, said method comprising the steps of:
   initiating the closing of said highest stage movable guide vanes;
   initiating the closing of said lowest stage movable guide vanes after initiation of closing said highest stage movable guide vanes;
   judging whether a closing relation between said highest stage movable guide vanes and said lowest stage movable guide vanes is normal or not in accordance with predetermined criteria after initiation of closing said lowest stage movable guide vanes;
   continuing to close said highest stage movable guide vanes and said lowest stage movable guide vanes when said closing relation is judged to be normal;

returning to said judging step after said continuing step if said lowest stage movable guide vanes are not completely closed;

stopping the closing of said highest stage movable guide vanes and said lowest stage movable guide vanes when said closing relation is judged to be abnormal;

closing said inlet valve at the same time or after said stopping step; and resuming the closing of said highest stage movable guide vanes and said lowest stage movable guide vanes after said inlet valve is completely closed.

5. The method according to claim 4, wherein said judging step comprises:

deciding whether or not said closing relation is normal in accordance with whether or not an opening of said highest stage movable guide vanes is smaller than an opening of said lowest stage movable guide vanes.

6. The method according to claim 4, wherein said judging step comprises:

deciding whether or not said closing relation is normal in accordance with whether or not a water pressure value in said return passage is smaller than a predetermined water pressure value.

* * * * *